US010751979B2

(12) United States Patent
Grefenstein et al.

(10) Patent No.: US 10,751,979 B2
(45) Date of Patent: Aug. 25, 2020

(54) RECYCLABLE POLYETHYLENE FILM

(71) Applicant: Constantia Pirk GmbH & Co. KG, Pirk (DE)

(72) Inventors: Achim Grefenstein, Altrip (DE); Stefan Büttner, Neumarkt i. d. Oberpf. (DE); Ingo Geillersdörfer, Mantel (DE)

(73) Assignee: Constantia Pirk GmbH & Co. KG, Pirk (DE)

( * ) Notice: Subject to any disclaimer, the term of this patent is extended or adjusted under 35 U.S.C. 154(b) by 0 days.

(21) Appl. No.: 16/316,185

(22) PCT Filed: Jul. 8, 2016

(86) PCT No.: PCT/EP2016/066321

§ 371 (c)(1),
(2) Date: Jan. 8, 2019

(87) PCT Pub. No.: WO2018/006980

PCT Pub. Date: Jan. 11, 2018

(65) Prior Publication Data

US 2019/0344551 A1 Nov. 14, 2019

(51) Int. Cl.

*B32B 27/08* (2006.01)
*B32B 27/32* (2006.01)
*B65D 65/40* (2006.01)

(52) U.S. Cl.

CPC ............ *B32B 27/327* (2013.01); *B32B 27/08* (2013.01); *B65D 65/40* (2013.01);

(Continued)

(58) Field of Classification Search

CPC ......... B32B 27/08; B32B 27/18; B32B 27/32; B32B 2250/40; B32B 2250/02;

(Continued)

(56) References Cited

U.S. PATENT DOCUMENTS 4,287,117 A * 9/1981 Theysohn ................ H01B 1/24 524/496
5,500,283 A * 3/1996 Kirk ......................... B05D 3/12 428/349

(Continued)

FOREIGN PATENT DOCUMENTS

DE 102005003922 A1 8/2006
EP 1543955 A1 6/2005

(Continued)

OTHER PUBLICATIONS

Encyclopedia of Polymer Science and Technology, John Wiley & Sons, 2011 (Year: 2011).*

(Continued)

*Primary Examiner* — Lee E Sanderson
(74) *Attorney, Agent, or Firm* — Whitmyer IP Group LLC

(57) ABSTRACT

The present teaching describes a recyclable polyethylene film of at least 80% polyethylene material and max. 20% compatible polyolefin material. The polyethylene film is less than 40 μm and has a central layer of linear low-density polyethylene (LLDPE) and/or metallocene linear low-density polyethylene (mLLDPE) and two outer layers made of high-density polyethylene (HDPE) and bonded to the central layer and surrounding a central layer. The HDPE content of the polyethylene film constitutes at least 60 vol %, preferably at least 70 vol %, especially preferably at least 80 vol. The two outer layers together are at least three times as thick as the central layer, preferably at least four times as thick. The polyethylene film is stretched in at least one direction.

22 Claims, 1 Drawing Sheet

(52) U.S. Cl.
CPC ..... *B32B 2250/242* (2013.01); *B32B 2270/00* (2013.01); *B32B 2307/306* (2013.01); *B32B 2307/516* (2013.01); *B32B 2307/75* (2013.01); *B32B 2553/00* (2013.01)

(58) Field of Classification Search
CPC ............ B32B 2250/04; B32B 2250/05; B32B 2250/03; Y10T 428/31913; B65D 65/40
USPC .......................................................... 428/515
See application file for complete search history.

(56) References Cited

U.S. PATENT DOCUMENTS

| | | | | |
|---|---|---|---|---|
| 5,897,941 | A * | 4/1999 | Shah | B32B 27/32 428/213 |
| 2003/0211350 | A1* | 11/2003 | Migliorini | B32B 27/08 428/515 |
| 2006/0177641 | A1 | 8/2006 | Breese et al. | |
| 2011/0003099 | A1* | 1/2011 | Vinck | B32B 27/32 428/34.9 |
| 2012/0033901 | A1 | 2/2012 | Votaw | |
| 2012/0315416 | A1* | 12/2012 | Chen | C08L 23/08 428/35.2 |
| 2014/0363645 | A1 | 12/2014 | Csatari | |
| 2018/0370202 | A1* | 12/2018 | Niedersuss | B32B 27/08 |

FOREIGN PATENT DOCUMENTS

| | | | |
|---|---|---|---|
| EP | 2860031 | A1 | 4/2015 |
| WO | 2009109367 | A1 | 9/2009 |
| WO | 2015052246 | A1 | 4/2015 |

OTHER PUBLICATIONS

Rosato et al., Concise Encyclopedia of Plastics, Springer, New York, 2000 (Year: 2000).*

International Preliminary Report on Patentability Application No. PCT/EP2016/066321 dated Jun. 4, 2018 5 Pages.

International Search Report & Written Opinion of the International Searching Authority Application No. PCT/EP2016/066321 Completed: Mar. 22, 2017; dated Apr. 3, 2017 11 Pages.

Russian Office Action, Translation and Search Report Application No. 2019103380/05 (006198) Completed: Aug. 9, 2019; dated Aug. 27, 2019 12 Pages.

* cited by examiner

RECYCLABLE POLYETHYLENE FILM

TECHNICAL FIELD

The present teaching relates to a recyclable polyethylene film with a high rigidity and heat resistance as well as a sufficiently high toughness.

BACKGROUND

The usual packaging films made of plastic today are film laminates comprising a variety of layers (depending on application and function), for example, polyolefins such as polyethylene (PE) or polypropylene (PP), often combined with polyethylene terephthalate (PET) as the outer printed layer. Usually layers of different plastics are combined. Laminates of plastic layers with other materials such as aluminum or paper are also conceivable. Packaging is essentially also always produced with printing that is visible on the outside. The printing is applied to a layer of the film laminate that is suitable for printing, for example, a layer of biaxially stretched polypropylene (BO-PP) or polyethylene terephthalate (BO-PET).

In most cases, an inline printing process such as the gravure printing process or the inline flexographic printing process is used as the printing process for high-quality packaging materials. In an inline printing process, the individual printing units are separated from one another and the film sheet to be printed passes through a dryer and multiple deflecting rollers, in order to lengthen the drying length, before each application of the next ink. With certain films, in particular PE films, however, this leads to problems with the register accuracy and/or to unacceptable print images. PE films and PE film laminates are therefore usually printed by flexographic printing processes in satellite configuration on so-called central printing cylinder machines. In such machines the film sheet to be printed is held between the individual printing units on a central cylinder and only then is it dried. Also, a possible intermediate drying after one application of ink is carried out on the central cylinder wherein the film sheet is also held on the central cylinder during drying, but this does not usually allow complete drying between the printing units because the drying length is very short. Therefore, the print quality in a flexographic printing process in satellite configuration is not as high as it would be in the inline printing process. But the thereby achievable register accuracy is high enough even when using PE films, for example for diaper films.

With high-quality packaging laminates, the packaging manufacturers usually require printing of the film laminate by an inline printing process, for example by a gravure printing process or by a (UV) flexographic inline printing process, because of the print image which is thereby achievable. Therefore, a PET or PP film sheet is used as the printed film sheet in such film laminates, which are then laminated with a sealable material that is capable of sealing at low temperatures, such as PE films, to form the film laminate.

The film laminates for the packaging industry should naturally be as thin as possible for cost reasons. This means that the individual film layers should be designed to be as thin as possible, depending on their function. An outer layer which carries only the print image should be as thin as possible. According to the state of the art today, for example, printed PET film sheets with layer thicknesses of only 12 μm are used.

However, such film laminates that are used in the packaging industry are difficult to recycle because of the different materials they contain because the materials are difficult to separate. Therefore, there is a discernible trend to use so-called monolaminates in the packaging industry, i.e., film laminates made of (essentially) only one material. In particular, a monolaminate of polyethylene (PE) is of interest here because polyethylene is the most widely used sealing medium in the packaging industry. Film laminates consisting of a main material, for example, PE and containing only small amounts of any other material are also used as monolaminates. Such film laminates are still regarded as monolaminates in the sense of the present teaching and are relatively easy to recycle.

The problem with a monolaminate of polyethylene is that PE films with an industrially relevant thickness of less than 40 μm can be printed only to a limited extent or not at all in the required quality when using the inline printing systems, and in particular not by gravure printing process or a flexographic inline printing process. Thus, it has not yet been possible to produce such polyethylene monolaminates that are printed by the gravure printing process and can be used for the packaging industry.

DE 10 2005 003 922 A1 discloses a film laminate of a stretched HDPE printing film and an LDPE backing film, wherein the printed film is printed. The backing film should be significantly thicker than the printing film.

SUMMARY

It is an object of the present teaching to provide a polyethylene film that can be printed by using an inline printing process, in particular the gravure printing process or flexographic inline printing process, that can be used in the packaging industry and that is easy to recycle.

This object is achieved with a polyethylene film consisting of at least 80% polyethylene material and max. 20% compatible polyolefin material, wherein the polyethylene film is less than 40 μm thick and has a central layer of linear low-density polyethylene (LLDPE) and/or metallocene linear low-density polyethylene (mLLDPE) and two outer layers made of high-density polyethylene (HDPE) surrounding the central layer and bonded to it, wherein the amount of HDPE in the polyethylene film constitutes at least 60 vol %, and the two outer layers together are at least three times thicker than the central layer, and wherein the polyethylene film is stretched in at least one direction. With such a film, an adequate sheet rigidity of preferably at least 10 N/mm at 70° C. is achieved, which is sufficient for high-quality printing with an inline printing process, such as the gravure printing process or the flexographic inline printing process. With such a film, the register error in printing can be kept within tolerable limits for the packing industry. The haze value of the film is reduced by stretching the polyethylene film. In addition, the polyethylene film according to the present teaching has a sufficient toughness and heat resistance. The required high toughness and heat resistance of the film are achieved due to the layered structure with a thin, tough central layer and with, as compared to the central layer, much thicker outer layers, and due to the HDPE distribution mainly in the outer layers. These properties can be achieved better with a laminate according to the present teaching than with a film containing a large amount of HDPE and some LDPE as a blend in the film and/or in all layers of the film.

One of the outer layers is preferably max. 50% thicker than the other outer layer in order to prevent excessive curling of the polyethylene film. Ideally, the two outer layers have the same thickness.

Polyethylene film thicknesses of less than 30 μm, preferably less than 20 μm, can also be implemented due to the design of the polyethylene film, which makes this film usable for the packaging industry in particular.

To achieve the required rigidity, a stretching ratio of the polyethylene film greater than 1:2, preferably greater than 1:3 and in particular greater than 1:4, is advantageous.

To further improve the heat resistance of the polyethylene film in comparison with an outer layer of pure HDPE, it is advantageous if a heat-resistant polyolefin material is present in at least one outer layer. The heat-resistant polyolefin material can be applied as a coextruded layer to the outer layer or may also be blended into the outer layer, whereas both are also possible. So as not to impair the recyclability of the stretched PE film and the PE film laminate produced from it, the total amount of added polyolefin should not be more than 20% by weight.

If the polyethylene film has a haze value of less than 10, preferably less than 8, especially preferably less than 5, then the polyethylene film in the film laminate can also be used with backside printing (i.e., with printing inside the film laminate) because the film has sufficient transparency. The haze value can also be improved via the stretching ratio of the polyethylene film.

Another object of the present teaching is to provide a film laminate with a polyethylene film according to the present teaching, and in particular a monolaminate of polyethylene. Such a film laminate is characterized in that the polyethylene film according to the present teaching is laminated onto a backing layer, in particular one made of polyethylene.

It is thus possible for the first time to produce a recyclable monolaminate of polyethylene for the small thicknesses required in the packaging industry in which a PE layer is printed by an inline printing process.

It is most especially advantageous with the film laminate if the outer layer of the stretched and printed PE film is coated with a heat-resistant polyolefin material. This therefore relates to the side arranged facing away from the backing layer of polyethylene as a sealing layer, i.e., the outer side of the packaging laminate having the print image. Thus, because of the increased heat resistance of the polyethylene film, the sealing temperature in processing, in particular in a packaging process, can be increased. This improves the processability of the film laminate.

BRIEF DESCRIPTION OF THE DRAWINGS

The present teaching is explained in greater detail below with reference to FIGS. 1 and 2, which show, schematically and without restriction, advantageous embodiments of the present teaching, in which.

DETAILED DESCRIPTION

Figure 1:
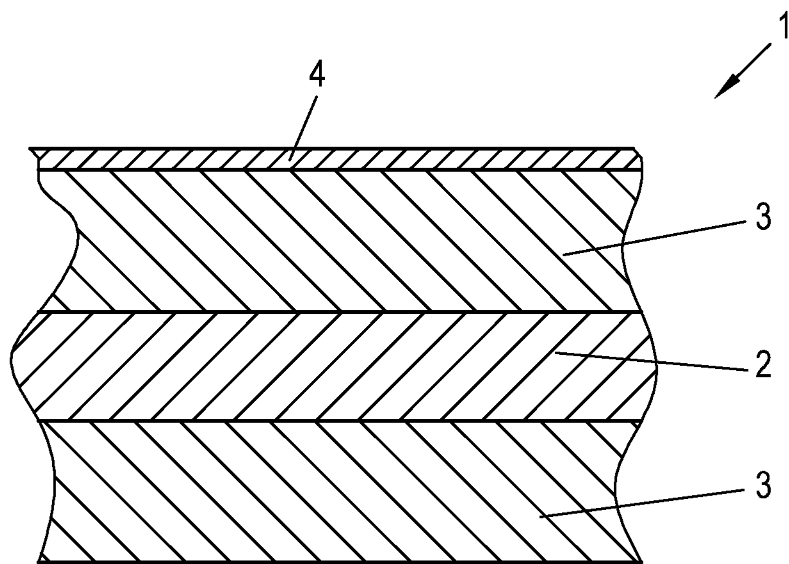
FIG. 1 shows a polyethylene film according to the present teaching.

The present teaching is described in greater detail below, wherein reference is made in the following description to certain properties of a plastic film which are measured and/or defined as follows. In doing so, the measurement methods defined in the well-known standards of the ASTM (American Society for Testing and Materials)—abbreviated ASTM standard are used.

Modulus of elasticity or E modulus:

This is measured according to ASTM D882, wherein as E modulus (in MPa) the 2% secant modulus in the machine direction as defined in the aforementioned standard is used. To measure the E modulus, a sample of material of the film sheet to be measured is used with a measurement length of 100 mm and a width of 25 mm, and the E modulus is measured at a test speed of 10 mm/min.

The E modulus at a certain temperature is then the measured E modulus at this temperature. To do so, the measurement is performed at the desired temperature.

The E modulus in the machine direction is the E modulus measured on a stretched film, wherein the machine direction corresponds to the direction of stretching of the film. However, this is the case only with film drawn in one direction but not with biaxially drawn films. In this case, the machine direction is the direction of conveyance of the film sheet.

Turbidity (Haze):

The haze value is a measure of the turbidity of transparent samples. The method for measuring the haze value is described in the ASTM D 1003 standard.

Sheet Rigidity:

Sheet rigidity (in N/mm) is understood to be the product of the E modulus as defined above and the thickness of the measured film sheet.

A polyethylene film 1 according to the present teaching with a layer thickness of less than 40 μm must have a sheet rigidity of at least 10 N/mm at 70° C. in order to be able to print the film with an adequate print quality even in an inline printing process. A layer thickness of the polyethylene film 1 in the range of 15 to 40 μm is aimed for in the packaging industry. Because of this sheet rigidity, the polyethylene film 1 is sufficiently rigid at a temperature of 70° C. to be printable with an inline printing process, such as the gravure printing process or the flexographic printing process, for example. Then it is possible to ensure a register accuracy of at least ±0.2 mm, which is sufficient for good printing results. If the sheet rigidity were lower, then the achievable register error in printing would be much greater, which would result in inadequate printing results when printed with an inline printing process. Register error occurs in particular because in an inline printing process (such as the gravure printing process or the flexographic inline printing process) with at least two separate printing units, each printing ink is applied individually and after each application of printing ink a drying step at a temperature of about 70° C. follows. The polyethylene film 1 is also deflected repeatedly guided through the dryer in each drying step to increase the length of the drying path. The polyethylene film 1 is therefore heated during printing. If the sheet rigidity is too low at this temperature, the polyethylene film 1 will expand during printing, so that the print image can be shifted in successive ink applications. This results in the register error.

Furthermore, the polyethylene film 1 should have a sufficiently high heat resistance, so that a film laminate produced with it can be sealed easily. In processing the film laminate, for example, in a packaging operation, the aim is to reach high sealing jaw temperatures in order to improve the processability and/or the melting of the sealing layer of the film laminate polyethylene film 1, for example, to produce bag packaging. The higher the possible sealing temperature, the better and more rapidly the polyethylene film 1 can be processed, which can be achieved with a sufficiently high heat resistance of the polyethylene film 1. The heat resistance essentially indicates the temperature above which the polyethylene film 1 begins to melt.

These goals are achieved with a polyethylene film 1 according to the present teaching having a thickness of less than 40 μm, having a relatively thin, tough central layer 2 and two much thicker outer layers 3 attached to each side thereof. To this end the polyethylene film 1 according to the present teaching should have an HDPE (high-density polyethylene) content of at least 60 vol % (percent by volume) to increase the sheet rigidity of the polyethylene film 1 and its heat resistance. In this way, the required properties of the polyethylene film 1 can be achieved. However, the total HDPE content of the polyethylene film 1 and also the arrangement of the HDPE within the layers of the polyethylene film 1 are important. According to the present teaching, the polyethylene film 1 is implemented multi-layered (FIG. 1) with at least one central layer 2 made mainly of LLDPE (linear low-density polyethylene) or mLLDPE (metallocene linear low-density polyethylene) (or a mixture thereof). The central layer 2 contains at least 80 vol % LLDPE or mLLDPE, while the remaining amounts may consist of other polyolefin materials, in particular a polyethylene, such as HDPE. The central layer 2 is surrounded on each of the two sides by an outer layer 3 of HDPE which serve to improve the toughness of the polyethylene film 1. The two outer layers 3 together are at least three times as thick as the central layer 2, preferably at least four times as thick. To prevent (excessive) curling of the polyethylene film 1, one of the two outer layers 3 is preferably max. 50% thicker than the other outer layer 3. Ideally a symmetrical layer structure with two outer layers 3 of the same thickness is used. Thus, for example, a 1.5/1/1.5 layer structure (outer layers 3 together being three times as thick as central layer 2) of the polyethylene film 1 with HDPE/LLDPE or mLLDPE/HDPE or a 2/1/2 layer structure (outer layers 3 together being four times as thick as central layer 2) with HDPE/LLDPE or mLLDPE/HDPE would thus fall under this definition. A possible asymmetrical layer structure would be 3/1/2 (outer layers 3 together being five times as thick as central layer 2) with HDPE/LLDPE or mLLDPE/HDPE. The thicker the outer layers 3 are together in comparison with the central one of the central layer 2, the greater is also the total HDPE content of polyethylene film 1, which constitutes at least 60 vol % according to the present teaching, preferably at least 70 vol % and most especially preferably at least 80 vol %.

Consequently, the HDPE content in the multilayer polyethylene film 1 is at least 60 vol %, preferably at least 70 vol % and most especially preferably at least 80 vol %, to achieve the required sheet rigidity and heat resistance. A small amount of another polyolefin material, for example, 5% to 10% LLDPE C8, may also be added to one or both HDPE outer layers 3, to further improve the toughness of polyethylene film 1.

The multilayer polyethylene film 1 can be produced by coextrusion of the individual layers. The central layer 2 could itself in turn be constructed of multiple layers. Likewise, an outer layer 3 may also be constructed of multiple layers.

To achieve the required sheet rigidity with the desired small layer thicknesses of the polyethylene film 1 of less than 40 μm more easily, the polyethylene film 1 is additionally stretched in at least one direction. Stretching of the polyethylene film 1 has the additional advantageous effect that the haze value of the polyethylene film is thereby reduced. The stretching ratio of the stretched polyethylene film 1 is preferably greater than 1:2, in particular greater than 1:3 and most especially advantageously greater than 1:4.

At least one of the two outer layers 3 is printed using an inline printing process such as the gravure printing process or the inline flexographic printing process (printing layer 4 in FIG. 1).

The printability of a polyethylene film 1 according to the present teaching for the packaging industry is confirmed in the following comparative example:

| | Polyethylene film | | | |
|---|---|---|---|---|
| | Film 1 50% LDPE, 50% LLDPE coextruded blend the same in all layers | Film 2 40% HDPE, 60% LLDPE coextruded HDPE in outer layers | Film 3 50% HDPE, 50% LLDPE coextruded HDPE in outer layers | Film 4 80% HDPE, 20% LLDPE coextruded HDPE in outer layers |
| Layer structure | 1/1/1 | 1/3/1 | 1/2/1 | 2/1/2 |
| Stretching ratio | none | 1:6 | 1:6 | 1:5 |
| Thickness [μm] | 70 | 25 | 25 | 20 |
| E modulus at 70° C. [MPa] | 75 | 350 | 480 | 750 |
| Sheet rigidity [N/mm] | 5.25 | 8.75 | 12 | 15 |
| Register accuracy [m] | ±0.7 | ±0.5 | ±0.15 | ±0.05 |

In the case of the stretched films 2, 3 and 4 the E modulus is the E modulus in machine direction.

In the table above, it is discernible that the polyethylene film 1 with a HDPE amount of more than 60 vol %, a layer distribution of at least 1.5/1/1.5 and with adequate stretching (film 3), due to the sheet rigidity thereby achieved, is rigid enough even at a thickness of less than 40 μm to be printable with the required register accuracy in inline printing presses (for example, gravure printing process or flexographic inline printing process). Without stretching, also films 3 and 4 would not be rigid enough for an inline printing process. Because of the HDPE content, films 3 and 4 also have a good heat resistance, and the heat resistance of film 4 is particularly good because of the high HDPE content of 80 vol %.

A film disclosed in DE 10 2005 003922A1 made solely from HDPE would also be rigid enough as a printing medium for printing and heat-resistant, but would not be tough enough for use as a packaging laminate and would tend to splice in the direction of stretching. However, all of these contradictory properties can be combined by using a film structure according to the present teaching.

The heat resistance of the polyethylene film 1 can be further improved if an outer layer 3 is supplemented with a compatible heat-resistant polyolefin material such as polypropylene (PP) or a cycloolefin copolymer (COC), for example. This heat-resistant material may be extruded as a thin layer onto the outer layer 3 on at least one side of the polyethylene film 1. However, it is also conceivable to blend the heat-resistant material into the at least one outer layer 3 made of a HDPE. Doing both at the same time is also conceivable, i.e., coextruded layer and blending. If, in addition to polyethylene, other heat-resistant polyolefins (in the various types) are also used in the polyethylene film 1, then the amount of polyethylene should constitute at least 80 vol % of the polyethylene film 1 in order not to have a negative effect on the recyclability of the polyethylene film 1. The remaining 20 vol % is formed by a compatible polyolefin material.

Figure 2:
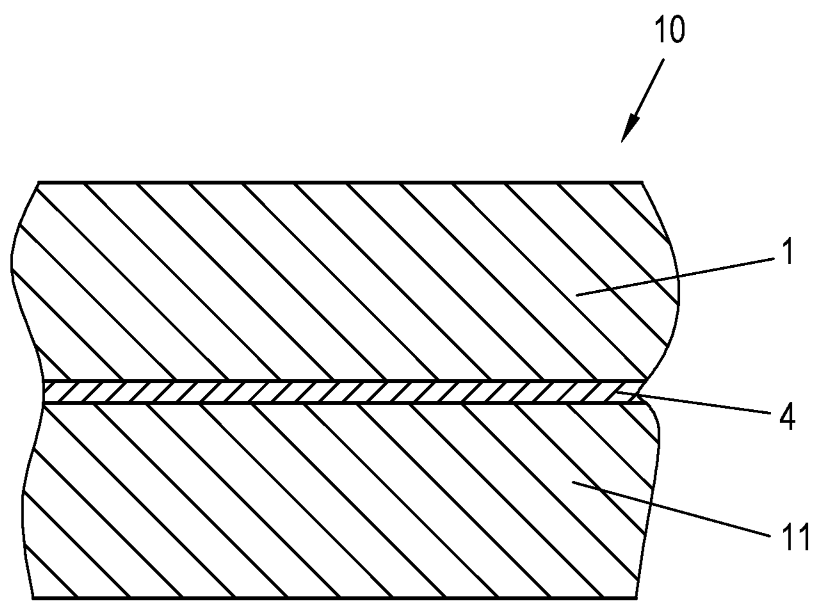
FIG. 2 shows a film laminate according to the present teaching with a polyethylene film.

A film laminate 10 according to the present teaching, in particular for the packaging industry, with a polyethylene film 1 as described above, as shown in FIG. 2, is produced as follows, for example:

First, a polyethylene film 1 according to the present teaching, having a thickness of less than 40 μm, preferably less than 30 μm, in particular preferably less than 20 μm, and with a sheet rigidity of at least 10 N/mm at 70° C. is produced. This polyethylene film 1 is printed on one side by means of a gravure printing process or is printed on at least one side in another inline printing process, for example, the flexographic inline printing process. This can take place with sufficient accuracy because of the rigidity achieved.

The polyethylene film 1 printed in this way is then laminated onto a backing film 11, preferably an unstretched backing polyethylene film, to produce the film laminate 10. If the backing film 11 is made of polyethylene, then a monomaterial laminate is produced. The printed side with the print layer 4 of the printed polyethylene film 1 may also be facing to the inside, i.e., to the backing film 11, if the turbidity of the printed polyethylene film 1 is sufficiently low. This may be assumed if the haze value of the printed polyethylene film 1 is lower than 10, preferably lower than 8, especially preferably lower than 5.

A backing polyethylene film of the film laminate 10 forms a sealing layer. If the polyethylene film 1 according to the present teaching contains an additional heat-resistant material in an outer layer 3 (as an admixture or as a separate coextruded layer), then this outer layer 3 is preferably arranged so that it faces away from the backing polyethylene film in order to be able to utilize the increased heat resistance.

Such haze values and also high rigidity values with thin packaging films can be achieved with polyethylene films 1 having an HDPE content, if a polyethylene film stretched in at least one direction is used as the printed polyethylene film 1. Then the otherwise turbid HDPE will be mostly transparent.

The printed polyethylene film 1 according to the present teaching may of course also be laminated to other layers or additional layers. For example, an intermediate aluminum layer by be provided as an aroma barrier in the film laminate. Likewise, the printed polyethylene film 1 or the backing film 11 may also be metalized or coated with a barrier coating. The printed polyethylene film 1 according to the present teaching could also be laminated to any other backing layer, depending on the application, wherein the backing layer itself may be embodied with multiple layers. However, because of the printing, the polyethylene film 1 according to the present teaching is preferably an outer layer of the film laminate 10 thereby produced.

The typical total thickness of the film laminate 10 according to the present teaching for the packaging industry is 40-120 μm. In the case of a monolaminate, a total thickness in the range of 30-150 μm is the goal.

The invention claimed is:

1. A recyclable polyethylene film of at least 80 vol % polyethylene material and maximum 20 vol % compatible polyolefin material, wherein the polyethylene film is less than 40 μm thick and has a central layer of linear low-density polyethylene (LLDPE) and/or metallocene linear low-density polyethylene (mLLDPE) and first and second outer layers made of high-density polyethylene (HDPE) bonded to the central layer and surrounding the central layer, wherein a heat-resistant polyolefin material is present in a maximum amount of 20 vol % in the first outer layer, the heat resistance indicating a temperature above which the polyethylene film melts, wherein the heat-resistant polyolefin material is coextruded with the first outer layer, wherein the HDPE content of the polyethylene film constitutes at least 60 vol %, and the two outer layers together are at least three times as thick as the central layer, wherein the polyethylene film is stretched in at least one direction, and wherein the heat-resistant polyolefin material comprises a polypropylene or a cycloolefin copolymer.

2. The recyclable polyethylene film according to claim 1, wherein one of the two outer layers is maximum 50% thicker than the other one of the two outer layers.

3. The recyclable polyethylene film according to claim 1, wherein the thickness of the polyethylene film is less than 30 μm.

4. The recyclable polyethylene film according to claim 1, wherein one of the two outer layers is adapted to be printed by an inline printing process.

5. The recyclable polyethylene film according to claim 1, wherein a stretching ratio of the polyethylene film is greater than 1:2.

6. The recyclable polyethylene film according to claim 1, wherein the polyethylene film has a haze value of less than 10.

7. A film laminate having at least one backing layer and a recyclable polyethylene film bonded thereto according to claim 1.

8. The film laminate according to claim 7, wherein the backing layer is produced from polyethylene.

9. The film laminate according to claim 7, wherein at least one outer layer is arranged so that it faces the backing layer.

10. The film laminate according to claim 7, wherein the first outer layer is arranged facing away from the backing layer.

11. The recyclable polyethylene film according to claim 1, wherein the HDPE content of the polyethylene film constitutes at least 80 vol %.

12. The recyclable polyethylene film according to claim 1, wherein the two outer layers together are at least four times as thick as the central layer.

13. The recyclable polyethylene film according to claim 1, wherein a stretching ratio of the polyethylene film is greater than 1:4.

14. The recyclable polyethylene film according to claim 1, wherein the polyethylene film has a haze value of less than 5.

15. A film laminate, comprising:

the recyclable polyethylene film according to claim 1;

a backing layer bonded to the second outer layer.

16. The film laminate of claim 15, wherein the recyclable polyethylene film is stretched before being bonded to the backing layer.

17. A polyethylene film, comprising:

a central layer of low-density polyethylene;

first and second outer layers of high-density polyethylene bonded to the central layer and surrounding the central layer;

the first and second outer layers together at least three times as thick as the central layer;

the first outer layer has a heat-resistant compatible polyolefin material, the heat resistance indicating a temperature above which the polyethylene film melts;

the polyethylene film is less than 40 μm thick;

the polyethylene film has at least 80 vol % polyethylene material and compatible polyolefin material in a maximum amount 20 vol %;

the polyethylene film has a high-density polyethylene content of at least 60 vol %;

the polyethylene film is stretched in at least one direction;

the heat-resistant compatible polyolefin material comprises a polypropylene or a cycloolefin copolymer.

18. The recyclable polyethylene film according to claim 17, wherein the second outer layer is adapted to be printed by an inline printing process.

19. A film laminate, comprising:

the recyclable polyethylene film according to claim 17 or claim 18;

a backing layer bonded to the second outer layer.

20. A method of producing the polyethylene film according to claim 17, comprising:

coextruding:

the central layer the first and second outer layers;

the heat-resistant compatible polyolefin material stretching the coextruded polyethylene film in at least one direction.

21. The method of claim 20, further comprising printing the second outer layer by an inline printing process.

22. A film laminate produced using the method of claim 20 or claim 21 by bonding a backing layer to the second outer layer of the polyethylene film.

* * * * *